(12) United States Patent
Moore

(10) Patent No.: US 10,245,714 B2
(45) Date of Patent: Apr. 2, 2019

(54) HYDRAULIC BUFFER WITH FAST STARTUP

(71) Applicant: CATERPILLAR INC., Peoria, IL (US)

(72) Inventor: Cody T. Moore, Waco, TX (US)

(73) Assignee: Caterpillar Inc., Deerfield, IL (US)

( * ) Notice: Subject to any disclaimer, the term of this patent is extended or adjusted under 35 U.S.C. 154(b) by 614 days.

(21) Appl. No.: 14/941,395

(22) Filed: Nov. 13, 2015

(65) Prior Publication Data

US 2017/0138376 A1    May 18, 2017

(51) Int. Cl.
| F15B 1/04 | (2006.01) |
| B25D 9/04 | (2006.01) |
| F16L 55/04 | (2006.01) |
| B25D 9/12 | (2006.01) |
| F16F 9/00 | (2006.01) |
| F16F 9/08 | (2006.01) |

(52) U.S. Cl.
CPC .............. B25D 9/12 (2013.01); F16F 9/00 (2013.01); F16F 9/082 (2013.01); *B25D 2209/002* (2013.01); *F15B 2201/31* (2013.01); *F15B 2201/3151* (2013.01); *F15B 2201/32* (2013.01)

(58) Field of Classification Search
CPC ....... F16F 9/00; B25D 9/12; B25D 2209/002; B25D 9/145; Y10T 29/49401; F15B 2201/3151; F15B 2201/32; F15B 2201/31
USPC .................................. 173/200, 204, 112, 208
See application file for complete search history.

(56) References Cited

U.S. PATENT DOCUMENTS

| 3,411,592 | A | * | 11/1968 | Montabert | ............... | B25D 9/12 |
| | | | | | | 173/207 |
| 3,468,222 | A | * | 9/1969 | Cordes | ................... | B25D 9/145 |
| | | | | | | 173/208 |
| 3,766,830 | A | * | 10/1973 | Montabert | .............. | B06B 1/183 |
| | | | | | | 91/26 |
| 5,279,120 | A | * | 1/1994 | Sasaki | ................... | B25D 9/145 |
| | | | | | | 173/135 |
| 5,549,031 | A | * | 8/1996 | Giordano | ............... | B25D 9/145 |
| | | | | | | 173/169 |
| 5,890,548 | A | * | 4/1999 | Juvonen | ................... | B25D 9/26 |
| | | | | | | 173/128 |
| 5,944,120 | A | * | 8/1999 | Barden | .................. | B25D 9/145 |
| | | | | | | 173/135 |
| 2005/0139277 | A1 | * | 6/2005 | Baltes | ...................... | F15B 1/12 |
| | | | | | | 138/30 |
| 2014/0209340 | A1 | * | 7/2014 | Moore | .................. | B25D 9/145 |
| | | | | | | 173/112 |

(Continued)

FOREIGN PATENT DOCUMENTS

| AU | 693543 | 8/1995 |
| DE | 202014102887U81 | 9/2014 |

*Primary Examiner* — Andrew M Tecco
*Assistant Examiner* — Nicholas Igbokwe
(74) *Attorney, Agent, or Firm* — Procopio, Cory, Hargreaves & Savitch LLP

(57) ABSTRACT

An accumulator assembly includes a vessel having an upper portion and a lower portion. The accumulator assembly includes a flexible membrane extending between the upper portion and the lower portion. The membrane may divide the vessel into a first interior chamber and a second interior chamber. The accumulator assembly includes a receptacle located proximate the vessel. The receptacle may be in fluid communication with the second interior chamber. The accumulator assembly includes a plunger located at least partially within the receptacle.

6 Claims, 3 Drawing Sheets

(56) References Cited

U.S. PATENT DOCUMENTS

| | | |
|---|---|---|
| 2014/0261827 A1 | 9/2014 | Moore |
| 2014/0262406 A1* | 9/2014 | Moore ................... B25D 9/145 173/208 |
| 2015/0000949 A1 | 1/2015 | Moore |
| 2015/0275474 A1* | 10/2015 | Aracama Martinez De Lahidalga ............... E02F 3/966 173/208 |

* cited by examiner

HYDRAULIC BUFFER WITH FAST STARTUP

TECHNICAL FIELD

This patent disclosure relates generally to hydraulic hammers, and more particularly to an accumulator assembly for a hydraulic hammer.

BACKGROUND

Hydraulic hammers can be attached to various machines such as excavators, backhoes, tool carriers, or other like machines for the purpose of milling stone, concrete, and other construction materials. The hydraulic hammer is mounted to a boom of the machine and connected to a hydraulic system. High pressure fluid is then supplied to the hammer to drive a reciprocating piston and a work tool in contact with the piston. The piston is usually included within an impact system that is surrounded and protected by an outer housing. A valve controls fluid to and away from the piston, and an accumulator provides a reservoir of the fluid at the valve. One or more passages connect the valve with the accumulator.

U.S. Patent Publication No. 2015/0000949 to Moore is directed to a surge accumulator for hydraulic hammer. The hydraulic hammer includes at least one accumulator that is connectable to a hydraulic circuit disposed in the housing of the hammer. The accumulator includes an annular base coupled to a cover with a diaphragm sandwiched therebetween. The annular base includes a proximal end and a distal end. The proximal end of the annular base defines a first central opening. The proximal end of the base in the housing define an annular inlet that encircles the first central opening and that is in communication with the first central opening. The cover also includes a proximal end and a distal end. The proximal end of the cover is coupled to the distal end of the base with the outer periphery of the diaphragm sandwiched therebetween.

The present disclosure is directed toward overcoming one or more of the problems discovered by the inventors or that is known in the art.

SUMMARY OF THE DISCLOSURE

In one embodiment, an accumulator assembly for a hammer assembly is provided. The accumulator assembly includes a vessel having an upper portion and a lower portion. The accumulator assembly includes a flexible membrane extending between the upper portion and the lower portion. The membrane may divide the vessel into a first interior chamber and a second interior chamber. The accumulator assembly includes a receptacle located proximate the vessel. The receptacle may be in fluid communication with the second interior chamber. The accumulator assembly includes a plunger located at least partially within the receptacle.

In another embodiment, a hydraulic hammer assembly is provided. The hydraulic hammer assembly includes an accumulator assembly. The accumulator assembly includes a vessel having an upper portion and a lower portion. The accumulator assembly includes a flexible membrane extending between the upper portion and the lower portion. The membrane may divide the vessel into a first interior chamber and a second interior chamber. The accumulator assembly includes a plurality of receptacles located proximate the vessel. Each receptacle may be in fluid communication with the second interior chamber. The accumulator assembly includes a plurality of plungers located at least partially within one of the receptacles. The hydraulic hammer assembly further includes a work tool located at an opposite end of the hammer assembly from the accumulator assembly.

In yet another embodiment, a hydraulic hammer assembly is provided. The hydraulic hammer assembly includes an accumulator assembly. The accumulator assembly includes a vessel having an upper portion and a lower portion. The accumulator assembly includes a flexible membrane extending between the upper portion and the lower portion. The membrane may divide the vessel into a gas chamber and a liquid chamber. The accumulator assembly includes an initial fluid system configured to provide an initial fluid into the liquid chamber upon an initiation of the hammer assembly. The hydraulic hammer assembly further includes a work tool located at an opposite end of the hammer assembly from the accumulator assembly.

DETAILED DESCRIPTION

This disclosure relates to a hydraulic hammer having an accumulator assembly. The hammer assembly may be attached to any suitable machine such as an excavator, backhoe loader, skid steer or similar machine. The accumulator assembly includes a cover and a base, in which the cover and the base form a vessel. The accumulator assembly may further include at least one plunger and at least one receptacle in communication with the vessel. The plunger and receptacle may form an initial fluid system that decreases the startup time of the hammer assembly.

Figure 1:
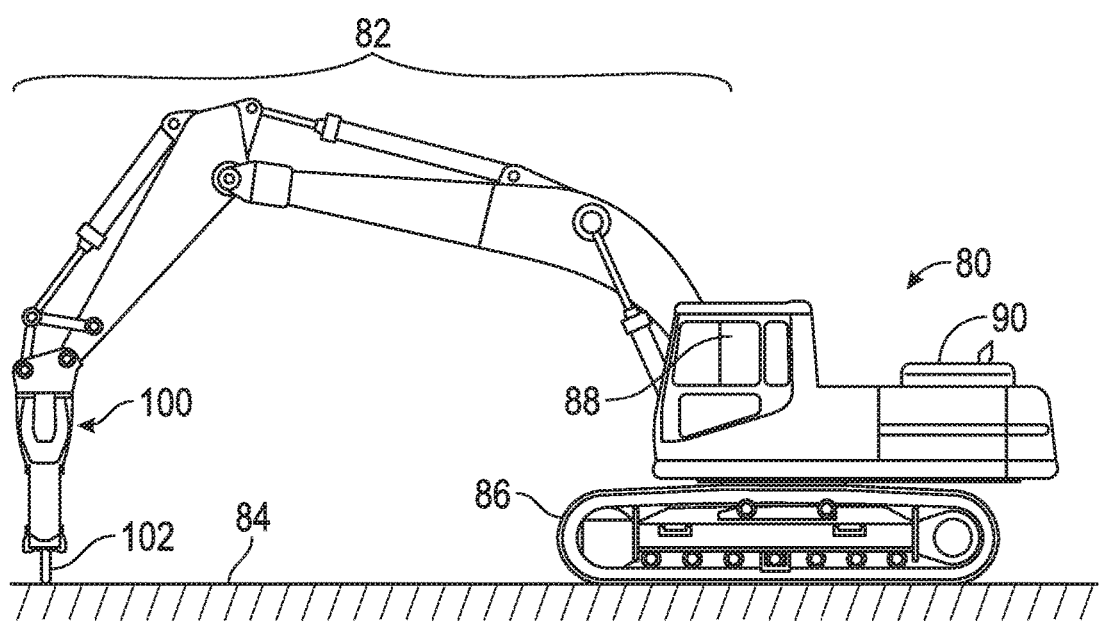
FIG. 1 is a perspective view of an example machine, which may use a hammer assembly according to an embodiment of the present disclosure.

FIG. 1 is a perspective view of an example machine 80, which may use a hammer assembly 100 according to an embodiment of the present disclosure. Hammer assembly 100 may be attached to machine 80. Machine 80 may embody a fixed or mobile machine that performs some type of operation associated with an industry such as mining, construction, farming, transportation, or any other industry known in the art. For example, machine 80 may be an earth moving machine such as a backhoe, an excavator, a dozer, a loader, a motor grader, or any other earth moving machine. Machine 80 may include an implement system 82 configured to move the hammer assembly 100, a drive system 86 for propelling the machine 80, a power source 90 that provides power to implement system 82 and drive system 86, and an operator station 88 for operator control of implement system 82 and drive system 86.

Power source 90 may embody an engine such as, for example, a diesel engine, a gasoline engine, a gaseous fuel-powered engine, or any other type of combustion engine known in the art. It is contemplated that power source 90 may alternatively embody a non-combustion source of power such as a fuel cell, a power storage device, or another source known in the art. Power source 90 may produce a mechanical or electrical power output that may then be converted to hydraulic pneumatic power for moving the implement system 82.

Implement system 82 may include a linkage structure acted on by fluid actuators to move the hammer assembly 100. The linkage structure of implement system 82 may be complex, for example, including three or more degrees of freedom. The implement system 82 may carry the hammer assembly 100 for breaking an object or ground surface 84. The structure and operation of a hammer assembly 100 are described in greater detail below.

Figure 2:
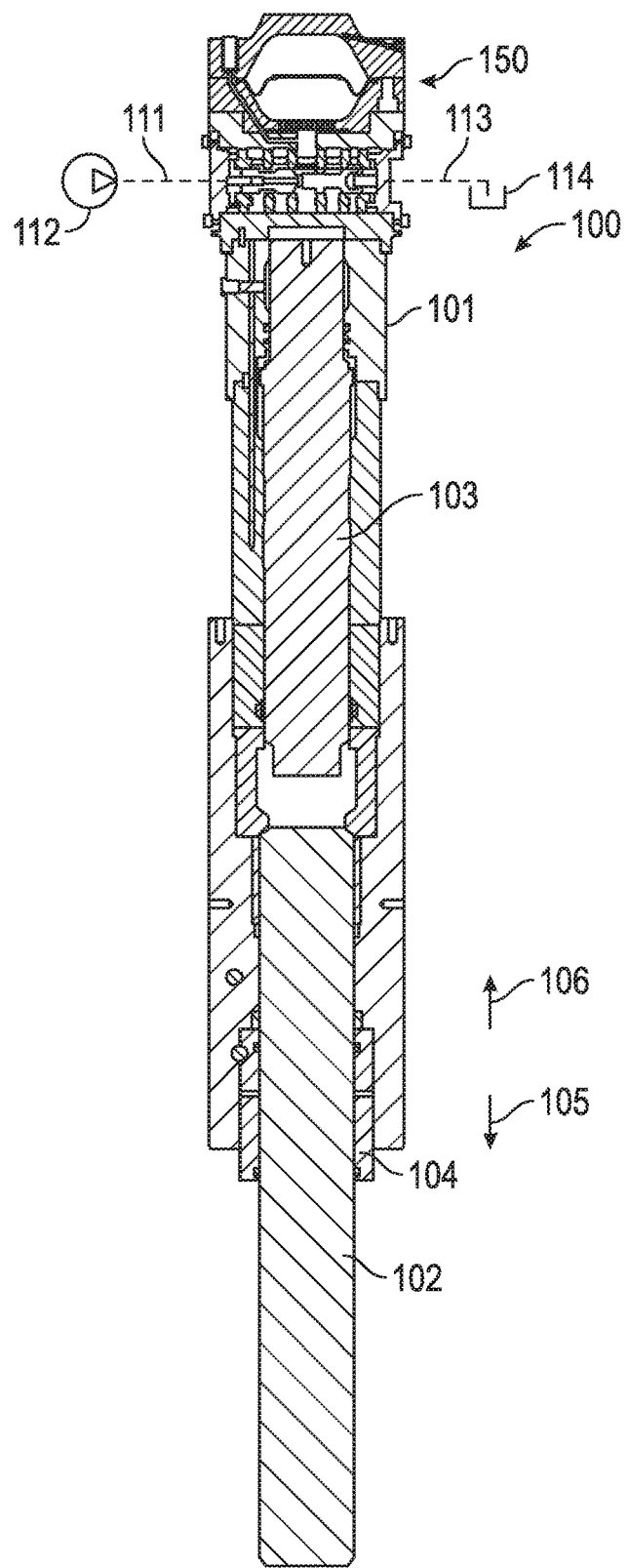
FIG. 2 is a schematic sectional view of a hammer assembly according to an embodiment of the present disclosure.

FIG. 2 is a schematic side sectional view of a hammer assembly 100 (sometimes referred to as a power cell) according to an embodiment of the present disclosure. In some embodiments, the hammer assembly 100 may be symmetrical forming an enclosed assembly with one or more openings providing access to an interior of the assembly. Hammer assembly 100 may include a housing 101 having a cylindrical shape. A piston 103 may be slidably supported within the housing 101 of the hammer assembly 100. Additionally, a work tool 102 may be supported by a bushing assembly 104 in a lower end of housing 101 with a portion of work tool 102 extending outward therefrom. The work tool 102 may have any configuration, such as for example a chisel, that would be useful in hammering applications. The work tool 102 also may be configured so as to be removable so as to allow a variety of tools with different configurations to be attached to the hammer assembly 100.

The piston 103 may be supported so as to be movable relative to the housing 101 in a reciprocating manner generally in the direction of arrows 105 and 106. More specifically, during an impact or work stroke, the piston 103 moves in the general direction of arrow 106 and near the end of the work stroke comes into contact with the work tool 102 such as shown in FIG. 2. Conversely, during a return stroke, the piston 103 retracts away from contact with the work tool 102 in the general direction of arrow 106. The reciprocating impacts of the piston 103 on the work tool 102, in turn, drive a corresponding reciprocating movement of the work tool 102. When the piston 103 strikes the work tool 102, the force of the piston 103 is transmitted to the work tool 102 in the general direction of arrow 105. This force may be applied to a hard object such as rock, concrete or asphalt in order to break up the object.

The reciprocating movement of the piston 103 may be driven, at least in part, by pressurized fluid, such as pressurized hydraulic fluid, provided by a high pressure source connected to the power source 90 of the machine 80 via the implement system 82. To this end, the hammer assembly 100 may include a high pressure inlet 111 which is coupled to and in communication with a high pressure source, such as a hydraulic pump 112, and a low pressure outlet 113, which is coupled to and in communication with a low pressure region such as a reservoir or tank 114 (both the high pressure inlet 111 and the low pressure outlet 113 are shown schematically in FIG. 2). The hydraulic pump 112 and tank 114 may be provided by connecting the hammer assembly 100 to the hydraulic system of the machine 80 via the implement system 82. While a particular pressurized fluid system has been described, those skilled in the art will appreciate that the present disclosure is not limited to any particular pressurized fluid system and that any suitable arrangement capable of driving upward and downward reciprocating movement of the piston 103 may be used.

An accumulator assembly 150 may be located at an outer end of hammer assembly 100. In some embodiments, accumulator assembly 150 is located at the opposite end of hammer assembly 100 from work tool 102. Further details related to accumulator assembly 150 will be discussed in FIG. 3 below.

Figure 3:
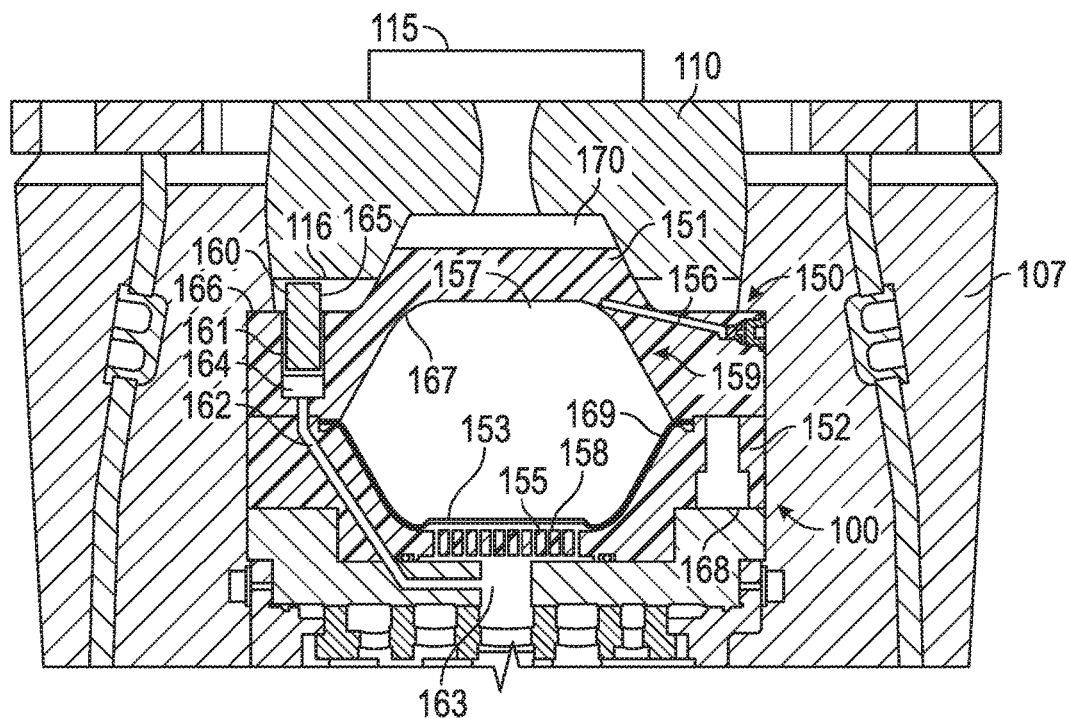
FIG. 3 is a partial, enlarged, sectional view of the hammer assembly of FIG. 2 showing an accumulator assembly before operation of the hammer assembly according to the embodiment of the present disclosure.

FIG. 3 is a schematic side sectional view of accumulator assembly 150 before operation of hammer assembly 100 according to the embodiment of the present disclosure. As shown, accumulator assembly 150 may be positioned within a hammer housing 107. Accumulator assembly 150 may also be located adjacent a dampener 110. Dampener 110 may be an annular pulsation dampener that decreases mechanical vibration within hammer assembly 100. Dampener 110 may have an inner surface 116 and an outer surface 117. Furthermore, dampener 110 may be adjacent a bracket 115 along outer surface 117. Bracket 115 may be a housing component that provides an initial load to dampener 110 from an external source. In some embodiments, the external source is machine 80 of FIG. 1. In some embodiments, an external load is applied to bracket 115 upon initiation of hammer assembly 100, as will be discussed in FIG. 4. In some embodiments, the external load is applied directly to dampener 110 by machine 80.

Accumulator assembly 150 may include a base 152 (sometimes referred to as a lower portion) and a cover 151 (sometimes referred to as an upper portion) that combine to form a vessel 159. Base 152 may be an annular component having an outer surface 168 and an inner surface 169. Cover 151 may be an annular component having an outer surface 166 and an inner surface 167. In some embodiments, cover 151 and dampener 110 may form an opening 170. Vessel 159 may be divided by a deformable partition member, such as a membrane 153. Membrane 153 may divide vessel 159 into a first interior chamber 157 (sometimes referred to as a gas chamber) that is in communication with a gas source and a second interior chamber 158 (sometimes referred to as a liquid chamber) that is in communication with a fluid source. The term membrane, as used herein, may encompass any flexible barrier, partition, wall or member that can divide a vessel 159 into two isolated chambers. In some embodiments, membrane 153 may be made of an elastically deformable material, such as rubber or the like.

First interior chamber 157 may be filled with nitrogen or another inert gas, which is pressurized. Second interior chamber 158 may be filled with a fluid such as oil. In addition, the volume of first interior chamber 157 and second interior chamber 158 may alter due to the movement of membrane 153. Membrane 153 may move in response to a change in the amount of pressurized fluid in the second interior chamber 158. As more pressurized fluid is added to the second interior chamber 158, membrane 153 will move upwards to accommodate the additional fluid, thereby shrinking the volume of first interior chamber 157. Likewise, removing pressurized fluid from second interior chamber 158 will cause membrane 153 to move downwards, thereby expanding the volume of first interior chamber 157.

In some embodiments, nitrogen flows through a charging conduit 156 which fills first interior chamber 157 with nitrogen. Charging conduit 156 may be in fluid communication an outside pressurized source, such as hydraulic pump 112 shown in FIG. 2. Hydraulic pump 112 may drive the flow of nitrogen through charging conduit 156 and into first interior chamber 157. In some embodiments, oil flows through an accumulator channel 163 which fills second interior chamber 158 with oil. Accumulator channel 163 may be in fluid communication with an outside pressurized source, such as reservoir 114 shown in FIG. 2. Reservoir 114 may be connected to a pump which may drive the flow of oil through accumulator channel 163 and into second interior chamber 158. In addition, the oil may flow in the direction of arrow 191 through a plurality of inlet holes 155 and then into second interior chamber 158.

Cover 151 of accumulator assembly 150 may include a plurality of receptacles 161 (sometimes referred to as a plurality of plunger cavities) and a plurality of plungers (sometimes referred to as an elongated member or a pin) 160 located about the circumference of cover 151. In some embodiments, each plunger has a long rectangular shape. In some embodiments, each plunger is in the form of a T. Each plunger 160 may be located partially or entirely within one of the receptacles 161. Each plunger 160 may be adjacent inner surface 116 of dampener 110.

In some embodiments, each receptacle 161 is located across from dampener 110. Further, each receptacle 161 may face inner surface 116 of dampener 110. In some embodiments, cover 151 includes at least two receptacles 161. In some embodiments, cover 151 includes at least three receptacles 161. In some embodiments, cover 151 includes at least six receptacles 161. Each receptacle 161 may be circumferentially spaced equidistantly from one another about the circumference of cover 151. Each receptacle 161 may have a diameter of approximately 10 mm to 50 mm. Each receptacle 161 may extend a depth of approximately 5 mm to 25 mm into cover 151 from an outer surface 166 of cover 151. Furthermore, each receptacle 161 may be filled to a certain depth with a fluid 164, such as oil. In some embodiments, fluid 164 is derived from fluid flowing through accumulator channel 163, which may be derived from an outside pressurized source such as reservoir 114. In some embodiments, each receptacle 161 is filled up to approximately 250 cc with fluid 164.

In some embodiments, each receptacle 161 is connected to an escape channel 162. Each escape channel 162 may be a conduit in fluid communication with accumulator channel 163. In some embodiments, each escape channel 162 extends through cover 151 and through base 152. In some embodiments, each escape channel 162 has a diameter of approximately 6 mm.

Before operation of hammer assembly 100, each plunger 160 may be partially situated in fluid 164 within receptacle 161. Each plunger 160 may also be adjacent dampener 110. In some embodiments, an exposed portion 165 of each plunger 160 may be located distally from outer surface 166 of cover 151. The exposed portion 165 may be located adjacent inner surface 116 of dampener 110. The length of exposed portion 165 may correlate to the volume of fluid located in one of the receptacles 161. The length of exposed portion 165 may range from approximately 5 mm to 25 mm. In some embodiments, the length of plunger 160 is approximately 10 mm to 50 mm.

INDUSTRIAL APPLICABILITY

The present disclosure generally applies to a hammer assembly 100 including an accumulator assembly 150. Accumulator assemblies 150 are designed to effectively absorb or accommodate the pulsating flow of the liquid in a pressurized circuit and consequently reduce or alleviate vibrations and noises caused by the pulsating flow. Accumulator assemblies 150 including a plurality of receptacles and a plurality of plungers may reduce the startup time of the hammer assembly 100. In addition, such accumulator assemblies 150 may reduce the waste of fluid after shut down of the hammer assembly 100.

Figure 4:
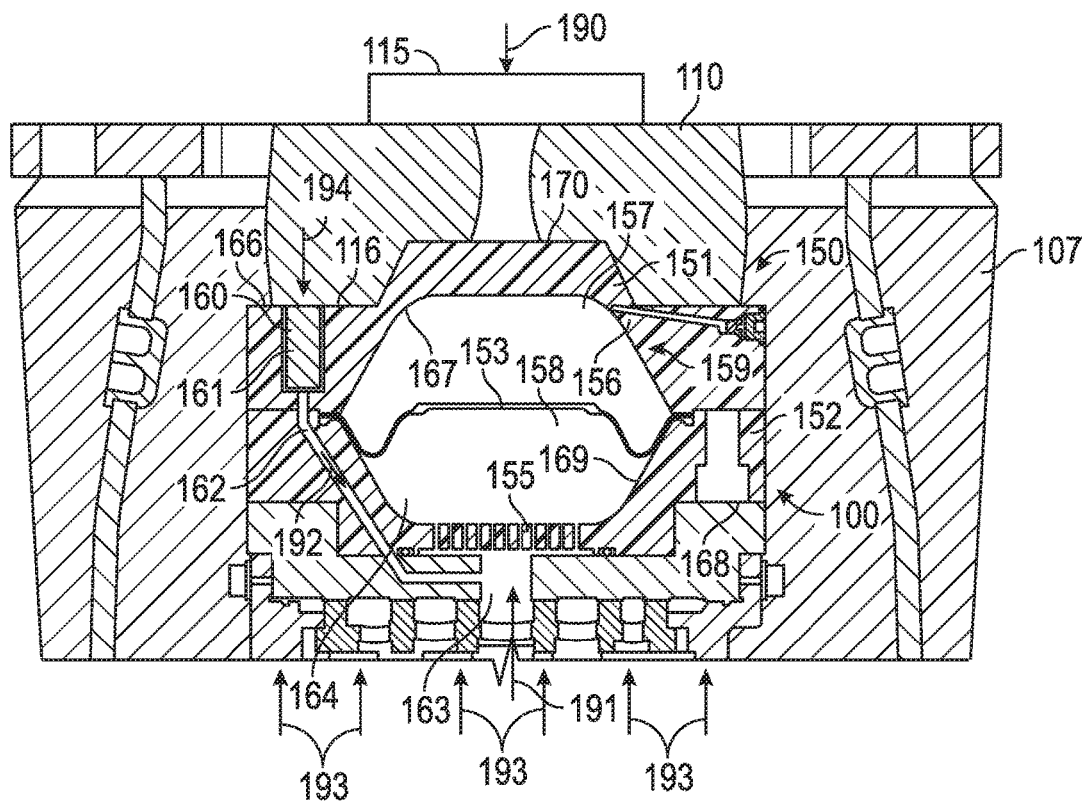
FIG. 4 is a partial, enlarged, sectional view of the hammer assembly of FIG. 2 showing an accumulator assembly during operation of the hammer assembly according to the embodiment of the present disclosure.

FIG. 4 is a schematic side sectional view of accumulator assembly 150 during operation of hammer assembly 100 according to the embodiment of the present disclosure. Upon initiation of hammer assembly 100, a load is applied in the direction of arrow 190 to a bracket 115 adjacent dampener 110. In some embodiments, work tool 102 of hammer assembly 100 (shown in FIG. 1) may be pressed against an object, such as a rock. The load applied to bracket 115 may drive work tool 102 into the rock. The rock may apply a resistance force against work tool 102 in the direction of arrow 193, which may shift hammer assembly 100 in the direction of arrow 193. Cover 151 may shift and compress into opening 170. As hammer assembly 100 shifts in the direction of arrow 193, each plunger 160 may press against inner surface 116 of dampener 110. This may cause each plunger 160 to plunge into their respective receptacle 161 in the direction of arrow 194. Each plunger 160 may be configured to displace fluid 164 out of each respective receptacle 161. The plunging motion may displace fluid 164 out of each receptacle 161 and through a respective escape channel 162 in the direction of arrow 192. Fluid 164 may exit out of each escape channel 162 and into accumulator channel 163, in which fluid 164 can be redirected into second interior chamber 158 in the direction of arrow 191. The flow of fluid 164 into second interior chamber 158 may propel membrane 153 in the direction of arrow 191. As shown in the figure, the propelling of membrane 153 may expand the volume of second interior chamber 158 and decrease the volume of first interior chamber 157.

The flow of fluid 164 into second interior chamber 158 may supplement a second flow of fluid into second interior chamber 158 in the same direction of arrow 191 from an external source such as reservoir 114. The second flow of fluid, hereinafter referred to as an external fluid, has a volume. As discussed above, fluid 164 in each receptacle 161 also has a volume. In some embodiments, the total cumulative volume of fluid 164 in all receptacles 161 is at least 50% of the volume of the external fluid. In some embodiments, the total cumulative volume of fluid 164 in all receptacles 161 is at least 60% of the volume of the external fluid. In some embodiments, the total cumulative volume of fluid 164 in all receptacles 161 is at least 70% of the volume of the external fluid. In some embodiments, the total cumulative volume of fluid 164 in all receptacles 161 is 100% of the volume of the external fluid.

After operation of hammer assembly 100 is complete, the load applied to dampener 110 in the direction of arrow 190 may cease. This may be due to the removal of load applied to bracket 115. Due to the removal of the load, hammer assembly 100 may return back to its normal position as shown in FIG. 3. Furthermore, the flow of the external fluid may cease and may flow back through accumulator channel 163 and drain into other components of machine 80. This may create a pressure differential in second interior chamber 158 due to the inert gas in first interior chamber 157. This pressure differential may cause fluid 164 to flow out of second interior chamber 158, through the plurality of inlet holes 155, through escape channel 162, and back into receptacle 161. The flow of fluid 164 back into each receptacle 161 may force each plunger 160 back into its original position shown in FIG. 3.

In some embodiments, the combination of the plurality of plungers 160 and receptacles 161 form an initial fluid system. The initial fluid system may be configured to provide an initial fluid, such as fluid 164, into second interior chamber 158. The initial fluid system may compress fluid 164 through each receptacle 161 into second interior chamber 158. The initial fluid system may be initiated by a load applied to cover 151 by machine 80, in which the load generates a resistance force from work tool 102. This may drive each plunger 160 into one of the receptacles 161 which may compress fluid 164 into second interior chamber 158.

In some embodiments, the combination of the plurality of plungers 160 and receptacles 161 form a fluid circuit. The fluid circuit may be configured to recycle fluid 164 in and out of second interior chamber 158. The return of fluid 164 back into each receptacle 161 may be an automatic process after operation of hammer assembly 100 is complete. In addition, the return of fluid 164 back into each receptacle 161 may provide for recycling of fluid 164 for repeat operations of hammer assembly 100. In some embodiments, the draining of the external fluid into other components of machine 80 can lead to waste of the external fluid to the surrounding environment. The recycling of fluid 164 can decrease the amount of wasted external fluid to the surrounding environment.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Further, embodiments of the present application are described herein with reference to a hydraulic or hydro-mechanical hammer assemblies, but embodiments of the present application are not limited to hydraulic or hydro-mechanical hammer assemblies, and may include other hydro-mechanical devices having an accumulator assembly as described herein.

All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An accumulator assembly for a hammer assembly, the accumulator assembly comprising:
    a vessel having an upper portion and a lower portion;
    a flexible membrane extending between the upper portion and the lower portion, the membrane dividing the vessel into a first interior chamber and a second interior chamber;
    a receptacle located proximate the vessel and in fluid communication with the second interior chamber;
    a plunger located at least partially within the receptacle; and
    a dampener facing the plunger, the dampener receiving an initial load from a machine, wherein a resistance force to the load drives the plunger towards the dampener, the dampener driving the plunger into the receptacle.

2. The accumulator assembly of claim 1, wherein the plunger is configured to displace a fluid in the receptacle into the second interior chamber.

3. The accumulator assembly of claim 2, wherein the fluid is displaced through an escape channel that is in fluid communication with the second interior chamber.

4. The accumulator assembly of claim 3, wherein the displaced fluid propels the membrane towards the cover and expands the volume of the second interior chamber.

5. The accumulator assembly of claim 3, wherein upon completing an operation of the hammer assembly, the fluid automatically flows back into the receptacle from the second interior chamber.

6. The accumulator assembly of claim 1, further comprising a pressurized fluid source in fluid communication with the second interior chamber.

\* \* \* \* \*